United States Patent
Sakai et al.

(10) Patent No.: US 11,091,371 B2
(45) Date of Patent: Aug. 17, 2021

(54) BORON STRUCTURE AND BORON POWDER OF HIGH PURITY

(71) Applicant: Tokuyama Corporation, Yamaguchi (JP)

(72) Inventors: Junya Sakai, Yamaguchi (JP); Tomohiro Yamamato, Yamaguchi (JP); Yuuki Yoshioka, Yamaguchi (JP); Shouji Fujii, Yamaguchi (JP)

(73) Assignee: Tokuyama Corporation, Yamaguchi (JP)

( * ) Notice: Subject to any disclaimer, the term of this patent is extended or adjusted under 35 U.S.C. 154(b) by 12 days.

(21) Appl. No.: 16/755,221

(22) PCT Filed: Oct. 12, 2018

(86) PCT No.: PCT/JP2018/038164
§ 371 (c)(1),
(2) Date: Apr. 10, 2020

(87) PCT Pub. No.: WO2019/078125
PCT Pub. Date: Apr. 25, 2019

(65) Prior Publication Data
US 2020/0317531 A1    Oct. 8, 2020

(30) Foreign Application Priority Data
Oct. 17, 2017   (JP) .............................. JP2017-200790

(51) Int. Cl.
*B32B 5/16* (2006.01)
*C01B 35/02* (2006.01)

(52) U.S. Cl.
CPC ........ *C01B 35/023* (2013.01); *C01P 2004/30* (2013.01); *C01P 2004/60* (2013.01); *C01P 2006/10* (2013.01); *C01P 2006/80* (2013.01); *C01P 2006/88* (2013.01)

(58) Field of Classification Search
CPC .............................. C01B 35/023; C23C 10/06
USPC ........................................................ 423/298
See application file for complete search history.

(56) References Cited

U.S. PATENT DOCUMENTS

| 2,542,916 A | 2/1951 | Fetterley |
| 3,226,248 A | 12/1965 | Talley |
| 3,811,917 A * | 5/1974 | Diefendorf ........... C23C 16/545 427/590 |
| 5,013,604 A | 5/1991 | Allen et al. |

FOREIGN PATENT DOCUMENTS

| CN | 105399106 A | 3/2016 |
| GB | 982893 A | 2/1965 |
| JP | S308256 A | 11/1955 |
| JP | 56-49852 A | 11/1981 |
| JP | 2-164711 A | 6/1990 |
| JP | 0323285 A | 1/1991 |
| JP | 10130016 A | 5/1998 |
| JP | 201582936 A | 10/2015 |

OTHER PUBLICATIONS

Online Translation copy and original copy of the Chinese Patent CN 105399106A (Year: 2016).*
WIPO International Preliminary Report on Patentability for Application No. PCT/JP2018/038164, dated Apr. 30, 2020.
English Abstract for CN105399106 A, Mar. 16, 2016.
European Patent Office, Extended European Search Report for Application No. EP18869351, dated Feb. 25, 2021.
Intellectual Property Office of Singapore, Written Opinion for Application No. 11202003305U, dated Feb. 19, 2021.
Huang, et al., "Research on Chemical Exchange Process of Boron Isotope Separation," Procedia Engineering 18 (2011) 151-156.
Stern, R., "High-Purity Crystalline Boron," Journal of the Electrochemical Society, vol. 105, No. 11, Nov. 1958 pp. 676-682.
English Abstract of JP 201582936A. Oct. 22, 2015.
English Abstract of JP 10130016A. May 19, 1998.
English Abstract of JP 2-164711A. Jun. 25, 1990.
English Abstract of JP 56-49852A. Nov. 25, 1981.
English Summary of JP S308256, prepared May 2020.

* cited by examiner

*Primary Examiner* — Hoa (Holly) Le
(74) *Attorney, Agent, or Firm* — Cahn & Samuels, LLP

(57) ABSTRACT

A boron structure body includes boron having each concentration of Ti, Al, Fe, Cr, Ni, Co, Cu, W, Ta, Mo and Nb being 0.1 ppmw or less and having a thickness of 0.8 to 5 mm. The boron structure body may have a tubular shape, and when used as a doping agent, a ratio of $^{11}$B that is an isotope may be 95 mass % or more. The boron structure body can be easily crushed, and a high-purity boron powder having an average particle diameter of 0.5 to 3 mm and having each metal impurity concentration of 0.3 ppmw or less can be obtained.

14 Claims, No Drawings

BORON STRUCTURE AND BORON POWDER OF HIGH PURITY

This application is a U.S. national stage application of PCT/JP2018/038,164 filed on Oct. 12, 2018 and claims priority to Japanese patent document JP 2017-200790 filed on 17 Oct. 2017, the entireties of which are incorporated herein by reference.

TECHNICAL FIELD

The present invention relates to a novel boron structure body and a boron powder. More particularly, the present invention relates to a boron structure body having a high purity and capable of being easily crushed, and a high-purity boron powder having a specific particle diameter.

BACKGROUND OF THE INVENTION

When single crystal silicon is produced, boron is sometimes used as a doping agent. In this case, a boron powder is introduced into a crucible of a single crystal pulling device. However, during working of introducing a boron powder, the boron powder is sometimes scattered. Moreover, boron as a doping agent is required to have a specific surface area of a certain degree. On this account, in order to prevent scattering of the boron powder and ensure a specific surface area of a certain degree, a high-purity boron powder having a particle diameter of several millimeters is desired.

Conventionally, high-purity boron is obtained by metal reduction of boron oxide, thermal decomposition of $BF_3$, or the like (see Patent Literature 1). However, boron obtained by the above method is an amorphous crystal of micron size or a microcrystal, and when such boron is used as a doping agent, it is easily scattered during working. In addition, such boron suffers environmental pollution during handling thereof and particularly when a surface oxide film is formed, impurities preset in the environmental atmosphere are incorporated, so that there is a problem that the concentrations of oxygen and metal components, particularly Fe, Ni, Co, Cu and the like, increase.

As technology for highly purifying bon, it has been proposed that boron of micron size is produced, processed into a rod shape by a hot press and highly purified by floating zone purification (see Patent Literature 2). However, the resulting rod-shaped boron has a hardness next to diamond and is extremely hard, so that in order to obtain a boron powder of a specific size (several millimeters), special processing of high power, such as laser cutting, or a large number of crushing steps become necessary. As the size of the rod-shaped boron is decreased by crushing the boron, contamination with impurities, particularly Fe, Ni, Co, Cu and the like, reaches into a bulk (inside of crushed fragment) during processing, and the boron is so contaminated that the impurities cannot be removed even if surface cleaning is carried out. Therefore, the particle diameter of a crushed fragment and the purity of the resulting boron particles are in a trade-off relationship, so that in order to obtain high-purity boron, the particle diameter size is limited, and it is difficult to obtain high-purity boron having the aforesaid particle diameter.

On the other hand, a method for obtaining thin film boron, including decomposing a boron-containing compound on a plate-shaped or linear metal substrate composed of tungsten or the like, then chemically or physically depositing boron on the substrate to form thin film boron, and thereafter removing the substrate by chemical treatment, has been proposed (see Patent Literature 3). It is thought that according to the method, when the boron-containing compound used as a raw material is highly purified, for example, a boron halide is purified to be 6N, and then chemically deposited, high-purity boron of 6N can be obtained. However, the above method is intended to produce a pick-up cantilever or a speaker diaphragm, each being a diaphragm member, and therefore, the thickness of the resulting boron film is at most several hundred μm, and even if this is crushed, a boron powder of several millimeter size cannot be obtained.

In Non Patent Literature 1, it is reported that a boron deposit having a diameter of 50 mmφ was obtained by heating a metal core wire of 4.5 mmφ and bringing a mixed gas of $BCl_3$ and $H_2$ into contact with this core wire to deposit boron. In this method, however, the metal of the core wire component diffuses into the boron deposit layer by the time the boron deposit of 50 mmφ is obtained, and even if chemical treatment is repeatedly carried out, a high-purity product necessary as a doping agent cannot be obtained. Moreover, crushing is difficult similarly to the aforesaid rod-shaped boron, and further contamination during the crushing cannot be avoided.

A method for obtaining a boron powder having an average particle diameter of 500 to 700 μm, including decomposing a boron-containing compound on seed boron by using a fluidized bed reactor and depositing a boron layer on the seed boron, has been proposed (see Patent Literature 4). In the method for producing a boron powder by a fluidized bed system, however, boron particles are contaminated from the reactor walls during growth of the particles, and there is limitation on the high purification.

As described above, in the conventional methods, it is difficult to obtain a high-purity boron powder having a particle diameter that is suitable for the use as a doping agent in the step of carrying out silicon single crystal pulling.

CITATION LIST

Patent Literature

Patent Literature 1: Japanese Examined Patent Publication No. S30-8256
Patent Literature 2: Japanese Unexamined Patent Application Publication No. H3-23285
Patent Literature 3: Japanese Examined Patent Publication No. S56-49852
Patent Literature 4: Japanese Unexamined Patent Application Publication No. H2-164711

Non Patent Literature

Non Patent Literature 1: David R. Stern and Lahmer Lynds, J. Electrochem. Soc., 105, No. 11 (1958), 676-682

SUMMARY OF INVENTION

Accordingly, it is an object of the present invention to provide a boran powder having a particle diameter that is suitable for the use as a doping agent in the aforesaid step of carrying out silicon single crystal pulling, and having a high purity.

In order to solve the above problem, the present inventors have earnestly studied, and as a result, they have found that in a method in which a boron halide represented by $BX_3$ (X is chlorine, bromine or iodine but is not fluorine) is fed together with hydrogen to a heated metal substrate to proceed hydrogen reduction of the boron halide and thereby deposit boron on the metal substrate, contamination due to diffusion of metal substrate components during deposition is suppressed by adjusting a thickness of deposited boron on the metal substrate to a specific thickness; a boron structure body obtained by removing a core wire after the deposition has a high purity and can be extremely easily crushed by controlling its thickness, and contamination during the crushing can be effectively reduced; and by crushing the boron structure body, a high-purity boron powder having a specific particle diameter, which was not able to be obtained by the conventional methods, can be obtained. Thus, the present inventors have completed the present invention.

The gist of the present invention to solve the above problem is as follows.

(1) A boron structure body comprising boron having each concentration of titanium, aluminum, iron, chromium, nickel, cobalt, copper, tungsten, tantalum, molybdenum and niobium being 0.1 ppmw or less, and having a thickness of 0.8 to 5 mm.
(2) The boron structure body according to (1), having tubular shape.
(3) The boron structure body according to (1) or (2), having a density of 2.2 g/cm$^3$ or more.
(4) The boron structure body according to any one of (1) to (3), wherein a ratio of $^{11}$B as an isotope of boron is 95 mass % or more.
(5) A boron powder being a crushed material of the boron structure body according to any one of (1) to (4), having an average particle diameter of 0.5 to 3 mm, and having each concentration of titanium, aluminum, iron, chromium, nickel, cobalt, copper, tungsten, tantalum, molybdenum and niobium being 0.3 ppmw or less.
(6) The boron powder according to (5), wherein the each concentration of titanium, aluminum, iron, chromium, nickel, cobalt, copper, tungsten, tantalum, molybdenum and niobium is 0.2 ppmw or less.
(7) A boron powder having an average particle diameter of 0.5 to 3 mm, and having each concentration of titanium, aluminum, iron, chromium, nickel, cobalt, copper, tungsten, tantalum, molybdenum and niobium being 0.3 ppmw or less.
(8) The boron powder according to (7), wherein the each concentration of titanium, aluminum, iron, chromium, nickel, cobalt, copper, tungsten, tantalum, molybdenum and niobium is 0.2 ppmw or less.
(9) The boron powder according to any one of (5) to (8), having an average particle diameter of 0.7 mm or more.
(10) The boron powder according to (9), wherein the average particle diameter is 0.8 mm or more.
(11) The boron powder according to any one of (5) to (10), wherein a content of a boron fine powder having a particle diameter of less than 0.5 mm is 40 mass % or less.

The boron structure body of the present invention has a high purity and a specific thickness. Owing to this, ease of crushing and high purity have been realized, and owing to lees contact with a crushing device, crushing can be carried out until a desired particle diameter. The boron powder obtained by crushing is free from fatal contamination and by carrying out etching treatment when necessary, a boron powder in an extremely highly pure state can be provided.

Hence, the boron powder of the present invention is useful as a doping agent having a high purity that is necessary for the use as a doping agent in the step of carrying out silicon single crystal pulling, and having a particle diameter suitable for handling.

DETAILED DESCRIPTION OF THE INVENTION (Boron Structure Body)

The boron structure body of the present invention is characterized by comprising boron with reduced metal impurity concentrations and having a thickness of 0.8 to 5 mm, preferably 1 to 3 mm.

That is to say, the boron structure body of the present invention is effectively inhibited from diffusion of metal components from a metal substrate into the structure body by restricting the deposit thickness of boron, as described later. In addition, the method for producing the boron structure body by hydrogen reduction of a highly purified boron halide also contributes to high purification of boron, and such low metal impurity concentrations as described above can be attained.

In the present invention, the metal impurities in the boron structure body and the boron powder are those attributed to metals that constitute a metal substrate, metals contained in raw materials, metals that constitute a deposition device, metals derived from a crushing device, etc., and specific examples of such metals include titanium, aluminum, iron, chromium, nickel, cobalt, copper, tungsten, tantalum, molybdenum and niobium. Titanium, aluminum, iron, chromium, nickel, cobalt and copper are frequently attributed to peripheral devices, environment, raw materials, or the like, and tungsten, tantalum, molybdenum, niobium and titanium are thought to be attributed to contamination derived from a metal substrate used in the boron deposition. In the boron structure body of the present invention, the concentrations of titanium, aluminum, iron, chromium, nickel, cobalt, copper, tungsten, tantalum, molybdenum and niobium are each 0.1 ppmw or less. The detection limit of the metals contained in boron is about 0.1 ppmw at this time. Accordingly, the metal impurity concentrations of the boron structure body of the present invention are each the detection limit or less.

In the boron structure body according to a preferred embodiment of the present invention, the total concentration of titanium, aluminum, iron, chromium, nickel, cobalt, copper, tungsten, tantalum, molybdenum and niobium is preferably 0.9 ppmw or less, more preferably 0.5 ppmw or less.

In the present invention, the metal concentration is a value obtained by measuring, by the use of ICP-MS, a metal concentration of a solution in which boron is completely dissolved. According to ICP-MS, metals other than the above metals are also analyzed, but in the boron structure body according to a preferred embodiment of the present invention, metals other than the above metals are not substantially contained, and their concentrations are each 0.1 ppmw or less that is the detection limit.

The upper limit of the thickness of the boron structure body of the present invention is extremely important when the boron structure body is crushed to obtain a boron powder, and if the thickness exceeds 5 mm, rushing becomes very difficult, contamination during crushing is marked, and a high-purity boron powder cannot be obtained. That is to say, since the crushing becomes difficult the impact strength given by a hammer or the like used in the crushing needs to be increased, and a plurality of crushing operations need to be carried out. As a result, metal contamination derived from a crushing tool drastically increases, and a high-purity product cannot be obtained. However, the boron structure body of the present invention has a thickness of 5 mm or less and can be easily crushed to have a prescribed particle diameter, so that metal contamination of the resulting boron powder derived from a crushing tool can be reduced to an extremely low level.

The upper limit of the thickness is effective also for preventing contamination during deposition of boron. If the thickness of boron formed on the metal substrate is too large, a difference between the temperature on the surface of the deposited boron and the temperature at the boron-metal substrate interface becomes large. That is to say, heat is not easily transferred from the metal substrate that is a heat source to the reactive surface. On this account, in order to keep the temperature on the growth surface constant, the temperature of the metal substrate needs to be raised. As a result, if boron is continuously deposited while keeping the surface temperature constant, the temperature at the boron-metal substrate interface increases, and the metal component constituting the metal substrate diffuses inside the deposited boron, and consequently, it remains as an impurity that cannot be removed by etching or the like. Such contamination is particularly called "bulk contamination" sometimes. By restricting the deposit thickness the present invention it becomes possible to prevent the diffusion of a metal component from the metal substrate and provide a high-purity boron structure body.

On the other hand, when the thickness of the boron structure body is smaller than the above range, strength of the resulting boron structure body decreases, and the boron structure body is broken during handling to cause a fine powder, or the boron structure body is so excessively crushed that a boron powder having a desired particle diameter cannot be obtained.

In the present invention, the shape of the boron structure body is not particularly restricted, but in the deposition of boron on the metal substrate described later, the shape of the structure body depends on the shape of the metal substrate. For example, when a metal core wire is used as the metal substrate, the resulting boron structure body becomes a tubular shape after removal of the core wire, and when boron is deposited on a metal plate, the boron structure body becomes a plate-shaped body. Industrially, it is advantageous to use a metal core wire for the deposition of boron, and the boron structure body is preferably tubular shape. In the case of a tubular boron structure body, its inner diameter (diameter) is 1.5 mm or more, preferably 2 to 5 mm, more preferably 2 to 3 mm. That is to say, as the inner diameter becomes smaller, the tubular body becomes dense, and rushing tends to become difficult. If the inner diameter is too large, it is not economical since the amount of the core wire metal used increase, and also much labor is required in the removal step of core wire. When the boron structure body is tubular, a pert of the tubular structure may be broken. In the removal of the metal core wire, it is difficult to remove the core wire only, so that a part of the structure is sometimes broken. Therefore, when the boron structure body is tubular, the structure may be a structure whose inner wall surface is partially exposed, that is, a boat-shaped structure.

The thickness of the boron structure body refers to a distance between a contact surface of boron with the metal substrate in the boron deposition on the metal substrate and an outermost surface (growth surface) of boron after the deposition. For example, when deposition reaction is carried out on a metal core wire, a tubular boron structure body is obtained by removing the metal core wire. In this case, the thickness of the boron structure body refers to a distance between a tube inner wall surface (surface having been in contact with the metal core wire) and a tube outer wall surface (growth surface). When boron is deposited on a plate-shaped metal, a plate-shaped boron structure body is obtained. In this case, the thickness of the boron structure body refers to a distance between a contact surface with the metal plate and an outermost surface (growth surface) of the plate-shaped boron. When the thickness is not uniform, the maximum value is taken as the thickness. The density of the boron structure body is preferably 2.2 g/cm$^3$ or more, me preferably 2.3 g/cm$^3$ or more.

When the boron structure body is used as the aforesaid doping agent, the ratio of $^{11}$B that is an isotope is preferably 95 mass % or more in order to suppress release of α-rays due to absorption of neutrons.

(Boron Powder)

The boron powder of the present invention is preferably a crushed material of the boron structure body though the production process for the powder is not particularly limited. The average particle diameter of the boron powder is 0.5 to 3 mm, preferably 0.7 to 3 mm, more preferably 0.8 to 3 mm, particularly preferably 1 to 2.5 mm. In the boron powder of the present invention, each concentration of titanium, aluminum, iron, chromium, nickel, cobalt, copper, tungsten, tantalum, molybdenum and niobium is 03 ppmw or less, preferably 0.2 ppmw or less, more preferably 0.1 ppmw or less. By crushing the boron structure body of the present invention, a boron powder having a desired particle diameter and having low metal impurity concentrations is easily obtained. The average particle diameter of the boron powder is a median diameter determined by a sieve.

The range of the average particle diameter is that of a preferred particle diameter required for a doping agent, and the particle diameter can be adjusted by the degree of crushing of the boron structure body. In the crushing, the boron structure body of the present invention can be extremely easily crushed, and therefore, it is possible to obtain a boron powder having a desired particle diameter with less contact with the crushing device. Therefore, when the boron structure body is crushed, metal contamination does not reach deep parts of boron particles, and the metal impurity concentrations can be kept extremely low. Moreover, by crushing a boron structure body having an extremely high purity as described above, a boron powder having extremely low metal impurity concentrations is obtained.

A boron powder having the above average particle diameter can be obtained by conventionally known method of crushing a rod-shaped boron body, but the powder is markedly contaminated by the crushing, and a purity targeted by the present invention can be never attained. Accordingly, it can be said that the boron powder decreased in the amounts of metal impurities while having the aforesaid average particle diameter has been provided by the present invention for the first time.

Metal impurities in the boron powder are broadly divided into bulk contamination occurring during production of the boron structure body and surface contamination occurring during crushing of the boron powder. Here, the bulk contamination includes not only contamination with titanium, aluminum, iron, chromium, nickel, cobalt and copper attributed to peripheral devices, environment, raw materials or the like but also contamination derived from tungsten, tantalum, molybdenum, niobium, titanium, etc. used for the metal substrate in the boron deposition. The surface contamination is metal contamination mainly derived from a crushing tool, and is contamination with iron, chromium, tungsten, molybdenum, etc.

In the boron powder according to a preferred embodiment of the present invention, the total concentration of titanium, aluminum, iron, chromium, nickel, cobalt, copper, tungsten, tantalum, molybdenum and niobium is 5 ppmw or less, preferably 4 ppmw or less, more preferably 2 ppmw or less. In the boron powder according to a preferred embodiment of the present invention, metals other than the above metals are not substantially contained, and their concentrations are each 03 ppmw or less, more preferably 0.2 ppmw or less, particularly preferably 0.1 ppmw or less that is the detection limit.

The boron powder of the present invention has low metal impurity concentrations as described above, and therefore, when the boron powder is used as a doping agent, troubles due to the metal impurities can be effectively prevented.

When the boron powder is produced by crushing the boron structure body, fragmentation of the boron structure body in its thickness direction takes place first That is to say, since the thickness is 5 mm or less, cracks are produced from the front surface (growth surface) of the boron structure body to the back surface (surface having been in contact with the metal substrate) thereof, and the structure body is crushed. On this account, fracture inside the boron structure body is little, and particles constituting the boron powder are frequently obtained in such a state that two opposite planes (that is, font surface (growth surface) and back surface (surface having been in contact with the metal substrate) of the boron structure body) are remained. The front surface (growth surface) and the back surface (surface having been in contact with the metal substrate) of the boron structure body are both highly smooth, and obviously differ from the fracture surface in the surface condition. In a preferred boron powder of the present invention, 50 mass % or more of the particles are particles in such a state that smooth surfaces of the boron structure body are remained. Since the smooth surface suffers less adhesion of impurities than the fracture surface, the boron powder of the present invention is decreased in surface contamination as compared with a usual crushed powder.

Since the boron structure body can be relatively easily crushed, a boron powder having a desired particle diameter is obtained without applying excessive impact during crushing. During crushing, a fine powder is also produced sometimes, but the amount thereof is small. According to a preferred embodiment, in the boron powder immediately after crushing, the ratio of a fine powder having a particle diameter of less than 0.5 mm is 40 mass % or less, preferably 20 mass % or less. According to a preferred embodiment, in the boron powder immediately after crushing 60 mass % or more, preferably 80 mass % or more of the whole powder has a particle diameter in the range of 0.5 to 3 mm. Therefore, the boron powder does not need to be further sifted after crushing, and can be used as a doping agent. However, in order to remove a fine powder having a particle diameter of less than 0.5 mm, sifting may be carried out. A powder having a particle diameter of more than 3 mm may be subjected to crushing again to obtain a powder having a particle diameter of 0.5 to 3 mm.

(Methods for Producing Boron Structure Body and Powder)

The method for producing the boron structure body of the present invention is not particularly restricted, but a typical production method is, for example, a method including feeding a boron halide represented by $BX_3$ (X is chlorine, bromine or iodine but is not fluorine) together with hydrogen to a heated metal substrate to proceed hydrogen reduction of the boron halide and thereby deposit boron on the metal substrate, wherein a thickness of deposited boron on the metal substrate is adjusted to 0.8 to 5 mm, preferably 1 to 3 mm, and the metal substrate is removed after completion of the deposition. The boron powder can be obtained by crushing the boron structure body obtained above. From the viewpoint of obtaining high-purity boron, boron halide gas and hydrogen gas having been purified to have a high purity are preferably used as the raw material gases, and purified gases of 6N or more are particularly preferably used.

The metal substrate is generally in the form of a metal ore wire or a metal plate. As the material, a metal that diffuses little into deposited boron on the surface of the substrate, such as tungsten, tantalum, molybdenum, niobium or titanium, is preferably used. When the metal core wire is used, its diameter is 15 mm or more, preferably 2 to 5 mm, more preferably 2 to 3 mm. As described above, as the diameter becomes smaller, the inner diameter of a boron structure body obtained as a tubular shape becomes smaller, and the boron structure body is densified and tends to become difficult to crush. The length of the metal core wire is not particularly restricted, but from the viewpoint of handling, a length of about 0.2 to 1 m is recommended. On the other hand, when a metal plate is adopted, its thickness is preferably about 0.1 to 1 mm taking into consideration strength and ease of removing described later, and from the viewpoint of handling, an area of about 0.01 to 1 $m^2$ is recommended. The surfaces of these metal substrates are preferably dean, and prior to the deposition reaction, the surfaces may be subjected to cleaning, etching, heat treatment or the like.

For heating the metal substrate, a publicly known heating system such as electric heating or radio frequency heating is adopted according to the shape of the metal substrate. Specifically, when the metal core wire is used, electric heating is preferable, and the ads of the metal core wire are connected to a pair of electrodes and an electric current is applied, whereby heating of the metal core wire can be carried out.

The heating temperature of the metal substrate is set to a temperature at which hydrogen reduction reaction occurs in the presence of a boron halide and hydrogen. Specifically, a temperature of 800 to 1400° C. is preferable. The reaction time may be a sufficient time in which a boron structure body having a desired thickness is obtained. By increasing the amounts of the raw material gases fed, a deposition rate for the boron structure body can be increased.

For feeding a boron halide and hydrogen to the metal substrate, a method including placing the metal substrate in a closed container having a gas feed port and a gas exhaust port and feeding a boron halide and hydrogen through the gas feed port is preferable. The boron halide and hydrogen fed come into contact with the metal substrate having been heated in the closed container, thereby depositing boron on the substrate surface. After the reaction, the exhaust gases are exhausted from the gas exhaust port. When the metal substrate is a metal core wire, a bell jar type apparatus, which is used in deposition of silicon, can be preferably applied as the closed container. In the above method, the feed ratio of hydrogen to the boron halide is generally 2 to 10 in terms of $H_2/BX_3$ molar ratio.

Through the hydrogen reduction of the boron halide, boron is deposited, whereby the dense boron structure body having a density of 2.2 $g/cm^3$ or me can be obtained. For obtaining the dense boron structure body, the reaction temperature is 1200° C. or higher, and the thickness of the boron structure body is preferably set to 0.8 mm or more. However, if the reaction temperature increases and the thickness of the boron structure body increases, the amount of impurities derived from the metal substrate sometimes increases, so that a care should be taken.

The method for adjusting the ratio of $^{11}$B that is an isotope to 95 mass % or more in the boron structure body of the present invention is, for example, a method in which a ratio of a $^{11}$B isotope in the boron halide that is a raw material is increased by a publicly known chemical exchange method. An ether complex of BF$_3$ having a $^{11}$B isotope ratio of 80.1 mass % that is a natural ratio and anisole (C$_6$H$_5$OCH$_3$) is formed, and by means of a reaction distillation column for carrying out chemical exchange reaction of the complex with BF$_3$ ($^{10}$BF$_3$+$^{11}$BF$_3$·C$_6$H$_5$OCH$_3$⇔$^{11}$BF$_3$+$^{11}$BF$_3$—C$_6$H$_5$OCH$_3$) and distillation, the ratio of $^{11}$B is increased, whereby BF$_3$ having a $^{11}$B isotope ratio of 95 mass % or more can be produced. This BF$_3$ is gasified and reacted with AlX$_3$ (X is Cl, Br or I) gas having been sublimed in a different container (BF$_3$+AlX$_3$→BX$_3$+AlF$_3$), whereby a boron halide in which $^{11}$BX$_3$ has been concentrated can be produced. Thereafter, by carrying out distillation purification, a boron halide raw material in which each concentration of titanium, aluminum, iron, chromium, nickel, cobalt, copper, tungsten, tantalum, molybdenum and niobium is 0.1 ppmw or less and the $^{11}$B isotope ratio is 95 mass % or more is obtained. The $^{11}$B isotope ratio refers to a ratio of $^{11}$B to the whole boron.

The method for removing the metal substrate after deposition of boron is not particularly restricted, but it is preferable to remove the metal substrate by dissolving out the metal substrate with a treatment solution composed of anhydrous methanol and bromine. More specific examples of such treatment solutions are described in Japanese Examined Patent Publication No. S56-49852. In the removal operation of the metal substrate, the surface of the boron structure body is also cleaned, but when necessary, cleaning treatment with an etching solution such as hydrofluoric acid or nitric acid and cleaning treatment such as washing with pure water may be carried out.

Since the boron structure body has an appropriate thickness, the structure body is easy to crush and can be crushed with little crushing energy, so that contamination into the deep part caused by crushing can be effectively prevented. As crushing means, publicly known means are adopted without any restriction. Specifically, manual crushing using a hammer and mechanical crushing using a stamping mill or the like are generally used, and manual crushing with a hammer suffering less friction during contact with a crushing device is preferable because contamination of the resulting boron powder is further educed. The crushing is carried out until the average particle diameter becomes 0.5 to 3 mm, preferably 1 to 2.5 mm. The material of a hammer head is not particularly limited, but from the viewpoint of reduction of contamination in the boron powder, the hammer may be a super hard material tool made of tungsten, molybdenum or the like or may be a usual hammer of stainless steel, carbon steel or the like.

After the crushing, cleaning treatment with an etching solution such as hydrofluoric add or nitric acid and cleaning treatment such as washing with pure water may be carried out, when necessary.

As described above, the boron structure body of the present invention is easy to crush, and can be crushed to have a desired particle diameter with less contact with the crushing device. Therefore, contamination does not reach the deep part, so that by carrying out the aforesaid cleaning treatment when necessary, it becomes possible to obtain a born powder in which each concentration of titanium, aluminum, iron, chromium, nickel, cobalt, copper, tungsten, tantalum, molybdenum and niobium is 0.3 ppmw or less.

EXAMPLES

In order to describe the present invention more specifically, examples are given below, but the present invention is in no way limited to those examples. In the following examples and comparative examples, thickness, metal impurity concentration, density and ratio of a $^{11}$B isotope in a boran structure body, and average particle diameter, metal impurity concentration and ratio of a fine powder having a particle diameter of less than 0.5 mm in a boron powder were evaluated in the following manner.

(Thickness of Boron Structure Body)

In a tubular boron structure body after removal of a metal care wire, a distance between a tube inner wall surface (surface having been in contact with the metal core wire) and a tube outer wall surface (growth surface) was measured using a vernier caliper. Measurement was carried out at 5 or more points, and the maximum value was taken as a thickness of the boron structure body.

(Metal Impurity Concentration of Boron Structure Body)

From the boron structure body, a sample of about 1 g was taken out, and it was dissolved in nitric acid. Then, concentrations of metals (titanium, aluminum, iron, chromium, nickel, cobalt, copper, tungsten, tantalum, molybdenum and niobium) in a solution in which boron had been completely dissolved were measured by ICP-MS.

(Density of Boron Structure Body)

The density was determined by an Archimedes method.

(Ratio of $^{11}$B Isotope in Boron Structure Body)

A powder obtained from the boron structure body was measured by a mass spectrometer to determine ratios of $^{11}$B and $^{10}$B.

(Average Particle Diameter of Boron Powder)

The boron powder was classified by a sieve, then a histogram was prepared, and from a cumulative volume of particles, a median diameter was determined.

(Metal Impurity Concentration of Boron Powder)

The metal impurity concentrations of the boron powder were measured in the same manner as in the measurement for the boron structure body. For crushing, a hammer with a head of stainless steel was used.

(Ratio of Fine Powder Having Particle Diameter of Less than 0.5 mm in Boron Powder)

After deposition of boron, a metal core wire was removed, and than a ratio of a weight of a fine powder having a particle diameter of less than 0.5 mm to a weight of a boron structure body was determined.

Experimental Example 1

Experimental Example 1-1

A bell jar type reactor in which a diameter of a bottom part was 30 cm, a height of a straight barrel part was 30 cm, and a height from a bottom plate to a ceiling part was 50 cm was prepared. A tungsten core wire having a diameter of 2 mm and a length of 200 mm was stood up in the reactor in such a manner that the core wire was in an inverted U shape. The air in the reactor was replaced with nitrogen, and thereafter, the nitrogen was replaced with hydrogen. The core wire was electrically heated to 1200° C., and a mixed gas in which commercial BCl$_3$ having each concentration of titanium, aluminum, iron, chromium, nickel, cobalt, copper, tungsten, tantalum, molybdenum and niobium being 0.1 ppmw or less and $H_2$ were mixed in such a manner that the $H_2/BCl_3$ molar ratio became 5 was allowed to flow at 10 L/min, thereby forming a boron layer in a prescribed thickness on the tungsten wire. The resulting boron rod was taken out, and using a treatment solution consisting of anhydrous methanol and bromine (bromine concentration: 200 g-bromine/liter), the core wire part was removed, thereby obtaining a tubular boron structure body. The structure body was composed of crystalline boron, and its thickness, metal impurity concentrations and density were measured. The results are set forth in Table 1. This structure body was manually crushed with a hammer (made of stainless steel) to obtain a boron powder. This powder was washed with a mixed solution of nitric acid and hydrofluoric acid, then washed with water and dried. A part of the resulting boron powder was collected, and an average particle diameter, metal impurity concentrations, and a ratio of a fine powder having a particle diameter of less than 0.5 mm were measured. The results are set forth in Table 2.

Experimental Examples 1-2 to 1-5

By changing the boron deposition time, the thickness of the boron structure body was changed. A thickness, metal impurity concentrations and a density of the boron structure body in each experimental example were measured. The results are set forth in Table 1. The resulting boron structure body was crushed and washed in the same manner as in Experimental Example 1-1. A part of the resulting boron powder was collected, and an average particle diameter, metal impurity concentrations, and a ratio of a fine powder having a particle diameter of less than 0.5 mm were measured. The results are set forth in Table 2. From Table 1 and Table 2, it can be seen that when the thickness of the boron structure body was in the range of 0.8 to 5 mm, a boron powder having an average particle diameter of 0.5 to 3 mm, containing a small amount of a fine powder and having a high purity was obtained by crushing the structure body.

Experiment Nos. 1-1 and 1-5 are comparative examples. When the thickness of the boron structure body was small (Experiment No. 1-1), the boron structure body was excessively fragmentated, and a boron powder having a desired particle diameter could not be obtained. When the thickness of the boron structure body was large (Experiment No. 1-5), contamination with large amounts of impurities derived from peripheral devices and the core wire took place, and since the crushing was difficult, contamination with impurities derived from the hammer took place, and the particle diameter of the powder also became too large.

Experimental Example 2

Experimental Examples 2-1 to 2-5

Experimental examples wee carried out in the same manner as in Experimental Example 1, except that the tungsten core wire was changed to a tantalum core wire. A thickness, metal impurity concentrations and a density of the boron structure body in each experimental example are set forth in Table 1. An average particle diameter, metal impurity concentrations, and a ratio of a fine powder having a particle diameter of less than 0.5 mm in the boron powder are set forth in Table 2. As can be understood from Table 1 and Table 2, the relationship between the thickness of the boron structure body and the metal impurity concentrations of the boron powder showed the same tendency as in the use of the tungsten core wire. Experiment Nos. 2-1 and 2-5 are comparative examples.

TABLE 1

| | | Boron structure body | | | | | | | | | | | |
|---|---|---|---|---|---|---|---|---|---|---|---|---|---|
| Experiment No. | Thickness of structure body (mm) | Metal impurity concentration of boron structure body (ppm w) | | | | | | | | | | | Density (g/ml) |
| | | Ti | Al | Fe | Cr | Ni | Co | Cu | W | Ta | Mo | Nb | |
| 1-1[x] | 0.5 | <0.1 | <0.1 | <0.1 | <0.1 | <0.1 | <0.1 | <0.1 | <0.1 | <0.1 | <0.1 | <0.1 | 2.37 |
| 1-2 | 1.1 | <0.1 | <0.1 | <0.1 | <0.1 | <0.1 | <0.1 | <0.1 | <0.1 | <0.1 | <0.1 | <0.1 | 2.37 |
| 1-3 | 2.2 | <0.1 | <0.1 | <0.1 | <0.1 | <0.1 | <0.1 | <0.1 | <0.1 | <0.1 | <0.1 | <0.1 | 2.37 |
| 1-4 | 4.6 | <0.1 | <0.1 | <0.1 | <0.1 | <0.1 | <0.1 | <0.1 | <0.1 | <0.1 | <0.1 | <0.1 | 2.37 |
| 1-5[x] | 8 | 3 | 2 | 25 | 3 | 31 | 1 | 12 | 250 | 5 | 3 | 8 | 2.37 |
| 2-1[x] | 0.5 | <0.1 | <0.1 | <0.1 | <0.1 | <0.1 | <0.1 | <0.1 | <0.1 | <0.1 | <0.1 | <0.1 | 2.37 |
| 2-2 | 1.1 | <0.1 | <0.1 | <0.1 | <0.1 | <0.1 | <0.1 | <0.1 | <0.1 | <0.1 | <0.1 | <0.1 | 2.37 |
| 2-3 | 2.2 | <0.1 | <0.1 | <0.1 | <0.1 | <0.1 | <0.1 | <0.1 | <0.1 | <0.1 | <0.1 | <0.1 | 2.37 |
| 2-4 | 4.6 | <0.1 | <0.1 | <0.1 | <0.1 | <0.1 | <0.1 | <0.1 | <0.1 | <0.1 | <0.1 | <0.1 | 2.37 |
| 2-5[x] | 8 | 1 | 3 | 83 | 2 | 18 | 2 | 25 | 4 | 780 | 47 | 41 | 2.37 |

[x] Experiment Nos. 1-1, 1-5, 2-1 and 2-5 are comparative examples.

TABLE 2

| | | | Boron powder | | | | | | | | | | |
|---|---|---|---|---|---|---|---|---|---|---|---|---|---|
| Experiment No. | Average particle diameter (mm) | Ratio of fine powder with particle diameter of less than 0.5 mm (mass %) | Metal impurity concentration of boron powder ppm w) | | | | | | | | | | |
| | | | Ti | Al | Fe | Cr | Ni | Co | Cu | W | Ta | Mo | Nb |
| 1-1× | 0.2 | 92 | <0.1 | <0.1 | <0.1 | <0.1 | <0.1 | <0.1 | <0.1 | <0.1 | <0.1 | <0.1 | <0.1 |
| 1-2 | 0.8 | 35 | <0.1 | <0.1 | <0.1 | <0.1 | <0.1 | <0.1 | <0.1 | <0.1 | <0.1 | <0.1 | <0.1 |
| 1-3 | 1.5 | 11 | <0.1 | <0.1 | <0.1 | <0.1 | <0.1 | <0.1 | <0.1 | <0.1 | <0.1 | <0.1 | <0.1 |
| 1-4 | 2.3 | 7 | <0.1 | <0.1 | <0.1 | <0.1 | <0.1 | <0.1 | <0.1 | <0.1 | <0.1 | <0.1 | <0.1 |
| 1-5× | 6.6 | 1 | 3 | 3 | 105 | 33 | 49 | 10 | 15 | 250 | 5 | 3 | 8 |
| 2-1× | 0.2 | 92 | <0.1 | <0.1 | <0.1 | <0.1 | <0.1 | <0.1 | <0.1 | <0.1 | <0.1 | <0.1 | <0.1 |
| 2-2 | 0.7 | 38 | <0.1 | <0.1 | <0.1 | <0.1 | <0.1 | <0.1 | <0.1 | <0.1 | <0.1 | <0.1 | <0.1 |
| 2-3 | 1.6 | 10 | <0.1 | <0.1 | <0.1 | <0.1 | <0.1 | <0.1 | <0.1 | <0.1 | <0.1 | <0.1 | <0.1 |
| 2-4 | 2.4 | 6 | <0.1 | <0.1 | <0.1 | <0.1 | <0.1 | <0.1 | <0.1 | <0.1 | <0.1 | <0.1 | <0.1 |
| 2-5× | 7.2 | 1 | 2 | 3 | 188 | 39 | 61 | 15 | 35 | 4 | 780 | 47 | 41 |

×Experiment Nos. 1-1, 1-5, 2-1 and 2-5 are comparative examples.

Experimental Example 3

An ether complex of commercial $BF_3$ having a $^{11}B$ isotope ratio of 80.1 mass % that was a natural ratio and anisole ($C_6H_5OCH_3$) was formed, and by means of a reaction distillation column for carrying out chemical exchange reaction of the complex with $BF_3$ and distillation, $BF_3$ having a high ratio of $^{11}B$ was obtained by concentration.

A ratio of $^{11}B$ in the resulting $BF_3$ was measured by a mass spectrometer, and as a result, the ratio of $^{11}B$ was 97 mass %. This $BF_3$ was gasified and introduced into a container having been heated to 250° C. together with sublimed $AlCl_3$ gas while adjusting flow rates in such a manner that the molar ratio between the $BF_3$ gas and the $AlCl_3$ gas became 1:1, and vapor phase reaction was carried out, thereby obtaining $BCl_3$. A ratio of $^{11}B$ in the $BCl_3$ obtained above was measured by a mass spectrometer, and as a result, the ratio of $^{11}B$ was 97 mass %.

This $BCl_3$ was subjected to hydrogen reduction in the same manner as in Experimental Example 1-1, thereby forming a boron structure body. The resulting boron structure body was composed of crystalline born and had a density of 2.37 g/cm³. Regarding a powder obtained from the structure body, ratios of $^{11}B$ and $^{10}B$ were measured by a mass spectrometer, and as a result, the ratio of $^{11}B$ was 97 mass %. From the boron structure body having a thickness of 2 mm, a boron powder having a particle diameter in the range of 0.8 to 2.5 mm and having an average particle diameter of 1.6 mm was obtained in a yield of 94% based on the boron structure body. Concentrations of Ti, Al, Fe, Cr, Ni, Co, Cu, W, Ta, Mo and Nb in the boron powder were each 0.1 ppmw less that was the detection limit.

The invention claimed is:

1. A boron structure body comprising boron having each concentration of titanium, aluminum, iron, chromium, nickel, cobalt, copper, tungsten, tantalum, molybdenum and niobium being 0.1 ppmw or less, and having a thickness of 0.8 to 5 mm.

2. The boron structure body according to claim 1, having a tubular shape.

3. The boron structure body according to claim 1, having a density of 2.2 g/cm³ or more.

4. The boron structure body according to claim 1, wherein a ratio of $^{11}B$ as an isotope of boron is 95 mass % or more.

5. A boron structure body to claim 1, having a total metal impurity concentration of 0.1 ppmw to 0.9 ppmw.

6. A boron powder comprising a crushed material of the boron structure body according to claim 1, having an average particle diameter of 0.5 to 3 mm, and having each concentration of titanium, aluminum, iron, chromium, nickel, cobalt, copper, tungsten, tantalum, molybdenum and niobium being 0.3 ppmw or less.

7. The boron powder according to claim 6, wherein the each concentration of titanium, aluminum, iron, chromium, nickel, cobalt, copper, tungsten, tantalum, molybdenum and niobium is 0.2 ppmw or less.

8. A boron powder having an average particle diameter of 0.5 to 3 mm, and having each concentration of titanium, aluminum, iron, chromium, nickel, cobalt, copper, tungsten, tantalum, molybdenum and niobium being 0.3 ppmw or less.

9. The boron powder according to claim 8, wherein the each concentration of titanium, aluminum, iron, chromium, nickel, cobalt, copper, tungsten, tantalum, molybdenum and niobium is 0.2 ppmw or less.

10. The boron powder according to claim 6, having an average particle diameter of 0.7 mm or more.

11. The boron powder according to claim 10, wherein the average particle diameter is 0.8 mm or more.

12. The boron powder according to any one claim 6, wherein a content of a boron fine powder having a particle diameter of less than 0.5 mm is 40 mass % or less.

13. A method of making the boron structure body, comprising:

feeding a boron halide represented by $BX_3$, wherein X is chlorine, bromine or iodine but is not fluorine, together with hydrogen to a heated metal substrate;

reducing the boron halide and depositing boron on the metal substrate, wherein contamination due to diffusion of metal substrate components during deposition is suppressed by adjusting a thickness of deposited boron on the metal substrate to a specific thickness; and obtaining a boron structure body by removing the metal substrate after the deposition, wherein the boron structure body comprises boron and titanium, aluminum, iron, chromium, nickel, cobalt, copper, tungsten, tantalum, molybdenum and niobium, each having a concentration of 0.1 ppmw or less, wherein the boron structure body has a thickness of 0.8 to 5 mm.

14. The method according to claim 13, further comprising crushing the boron structure body.

\* \* \* \* \*